Patented Oct. 23, 1945

2,387,543

UNITED STATES PATENT OFFICE 2,387,543

POLYMERIZATION CATALYSTS

Robert M. Thomas, Union, and Joseph F. Nelson, Elizabeth, N. J., assignors, by mesne assignments, to Jasco, Incorporated, a corporation of Louisiana No Drawing. Application January 2, 1941, Serial No. 372,892

8 Claims. (Cl. 260—94)

This invention relates to polymeric materials; relates particularly to iso-olefinic polymers; and relates especially to catalysts for the polymerization of olefins and olefinic mixtures, and especially to solutions of active halide catalyst complexes in low freezing solvents.

It has been found possible to polymerize iso-olefins and particularly isobutylene and its homologs into high molecular weight polymers having molecular weights ranging from 1000 up to molecular weights such as 27,000, 100,000, 250,000 and even higher, up to approximately 500,000 by a low temperature technique using gaseous boron trifluoride. It has also been found possible to polymerize such isoolefins either singly; or in admixture with other olefins and diolefins by an analogous low temperature technique, at temperatures ranging from 0° C. to —100° C. or lower by the use of a Friedel-Crafts type catalyst such as aluminum chloride, in solution in a low freezing solvent such as ethyl or methyl chloride or carbon disulfide or the like. Difficulty is, however, encountered in obtaining a sufficiently powerful catalyst due to the fact that the solubility of the Friedel-Crafts type catalyst or active halide substance, particularly aluminum chloride, is relatively low, and it is difficult to prepare catalyst solutions of the active halide substances in high concentrations which are sometimes desirable in the low freezing solvents. Aluminum chloride is soluble in many other organic solvents, in some of which it forms simple solutions from which it can be re-crystallized in pure form, and in others it forms complexes which can be recovered as such from the solution. Substantially all of these organic solvents are useless for the polymerization reaction, because of the fact that many of them freeze into inert solids at the low temperatures at which the high molecular weight polymers are formed, and in the others, the solubility of the AlCl₃ is far too low.

The present invention is based upon the discovery that the catalyst complexes (consisting of Friedel-Crafts type or active halide catalysts such as aluminum chloride and the like in combination with various complex-forming organic solvents) are soluble in various low freezing solvents; and while the complexes themselves solidify and become wholly inactive as catalysts, at temperatures at, above, or at most a very few degrees below room temperature, the solutions of these complexes in low freezing solvents do not freeze until temperatures very close to the freezing point of the pure solvents are reached, and such solutions of active halide-organic liquid complexes, in solution form, show powerful catalytic effects; and simultaneously, in most instances, a substantially greater amount of the active halide substances in the form of the complex will dissolve in the low freezing solvent than will the active halide substance alone. In preparing the catalyst, the active halide such as aluminum chloride is dissolved in a complex-forming organic liquid, such as nitromethane, nitroethane and the like, preferably to saturation, which in some instances yields a substantially pure complex, in other instances yields a solution of complex in an excess of the complex-forming liquid. The pure complex, in the latter case, is preferably isolated from the solvent by a suitable procedure, such as cooling to crystallize out the complex, or by volatilization or evaporation of the excess solvent. The complex is then dissolved in a low freezing solvent, such as ethyl or methyl chloride, in which it shows a high solubility, usually substantially higher than the solubility of the active halide alone in the low freezing solvent. The resulting solution of the complex in the low freezing solvent does not freeze, or precipitate out the complex at temperatures ranging from —10° C. to temperatures as low as —100° C. or even lower; and the solution of the complex shows a powerful polymerizing catalytic effect upon chilled olefinic material.

Thus, the invention consists of a catalyst in the form of a solution, of a complex of an organic solvent with a Friedel-Crafts type catalyst, or other active halide catalyst substance, in a low freezing solvent, and of the process of polymerizing olefinic substances, comprising the steps of dissolving an active halide catalyst in a complex-forming solvent, dissolving the complex in a low freezing solvent, chilling polymerizable, olefinic substances to a low temperature below 0° C. and preferably below —40° C. and polymerizing the olefinic materials by the addition thereto of the solution of the catalyst complex. Other objects and details of the invention will be apparent from the following description.

When practicing the invention, the catalyst of the invention is prepared by dissolving the active halide or Friedel-Crafts type catalyst substance selected from the group consisting of aluminum chloride, aluminum bromide, aluminum iodide, boron trifluoride, titanium tetrachloride, zirconium tetrachloride, uranium tetrachloride, ferric chloride, ferric bromide and the like, preferably to saturation in a complex-forming organic solvent such as nitromethane, nitroethane and other nitro paraffins, nitrobenzene, the nitro aralkyl compounds, the nitro alicyclic compounds, such as nitro cyclohexane, the dimers and trimers of isobutylene, the aliphatic and aralkyl acid halides such as acetyl chloride, benzoyl chloride, benzoyl bromide and their homologs, the organic sulfones such as dibenzyl sulfone, diphenyl sulfone and their homologs, sulfoxides, and aliphatic and aromatic thio-ethers. In some instances a saturated solution of the active halide in these substances is substantially all complex. In other instances it is a solution of the complex, and perhaps additional proportions of simple solution of the active halide in an excess of solvent over that required to form the complex. If desired, the xcess solvent, if any, may be removed either by crystallizing out the complex or by volatilization or distillation of the excess solvent. The actual catalyst is then prepared by dissolving the complex, either in pure form, or dissolved in an excess of the organic solvent, in a second low freezing solvent. In the preferred form, the pure complex, substantially free from uncombined complex-forming organic solvent is dissolved as a simple solution in the low freezing second solvent, such as ethyl or methyl chloride, propyl chloride, chloroform and the like. This is desirable because of the tendency of the complex-forming solvent, if present in excess, to precipitate out or crystallize at the desired low temperature. Thus, the catalyst of the invention consists of a solution of an active halide-organic solvent complex in a low freezing solvent, from which it either does not crystallize out or crystallizes out only very slowly at temperatures ranging from 0° C. down to —150° C. or lower. The catalyst may be prepared at room temperature or lower and may be kept at room temperature or at low temperatures according to its stability.

When the catalyst solution has been prepared, the polymerization process of the invention may be conducted by preparing a mixture of an iso-olefin, preferably isobutylene with a refrigerant such as solid carbon dioxide by which it is cooled to a temperature of —78° C., or mixed with a diluent-refrigerant such as liquid propane, liquid butane, liquid ethane, liquid ethylene, or even liquid methane by which the isoolefin is cooled to temperatures ranging from about 0° C. to temperatures well below —100° C. The polymerizable olefin may consist of an isoolefin such as isobutylene, alone or mixed with other polymerizable substances including propylene, the various iso-amylenes, the various iso-hexylenes and in some instances their higher homologs; and with various of the diolefins, such as butadiene, isoprene, dimethyl butadiene, pentadiene, hexadiene, cyclo pentadiene, cyclo hexadiene, and similar olefinic materials in combination with the refrigerant such as solid carbon dioxide or the diluent-refrigerant such as the above listed organic liquids and in addition a higher boiling solvent may be used such as ethyl or methyl chloride or butane, pentane, hexane or the like, or the higher alkyl chlorides and similar inert solvents.

A desirable range of proportions of the various substances utilized in this invention is found to include for each 100 parts of polymerizable olefinic material, an amount of solid carbon dioxide refrigerant sufficient to constitute an excess for the reaction, ranging from 100 parts to 500 parts; or of diluent-refrigerant such as liquid ethylene or liquid ethane, or the like, in the proportion of from 50 parts to 500 parts. The polymerizable olefin may be a pure olefin such as propylene, or isobutylene or the normal butylenes or the amylenes and the like, or may consist of a mixture of these various olefins or may consist of a mixture of the simple olefins with diolefins such as butadiene, isoprene, pentadiene, dimethylbutadiene and the like, preferably within the range of 50 parts of each constituent, to a proportion of 99 parts of the simple olefin to one part of the mixed olefin or diolefin.

To this olefinic material there is then added the catalyst as above described, in the proportion of from 10 volumes to 250 volumes of catalyst solution per 100 volumes of olefinic mixture. The catalyst solution may contain from 1.0 part to 100 parts of the active halide substance per 100 parts of catalyst solution.

The polymerization occurs rapidly when the catalyst is added to the olefinic reactants and may be substantially complete usually in from 1 minute to 30 minutes, but occasionally requiring several hours, depending upon the amount of catalyst added, the rate of stirring of the olefinic mixture, the total volume of olefinic reactants, the temperature and the dilution. When the reaction has reached the desired stage, which may be from the point when 10% of the reactants have reacted to the point where 100% of the reactants have reacted, or any desired stage between, the catalyst is desirably quenched by the addition of an oxygenated or alkaline liquid such as ethyl, methyl or propyl alcohol or similar hydroxy compound or water, alkaline solution, ammonia, ammonia solution, or the like. The polymer is then separated from the reaction mixture, warmed to room temperature and washed, whereafter it may be subjected to such other treatments as are appropriate to its composition.

The following examples show in detail the method of practicing the invention:

Example I

The dissolved catalyst complex of the invention was prepared by bringing together 150 parts by weight of nitromethane and 150 parts by weight of aluminum chloride, preferably anhydrous, or nearly anhydrous; the aluminum chloride being added in small portions to the cooled nitromethane. The solution occurred with reasonable speed, and the resulting solution which is liquid at room temperature thickened and finally set to a solid as the temperature was reduced to —78° C. This solution appears to be a complex of aluminum chloride and the nitromethane, with only a small percentage of uncombined nitromethane. The complex is soluble in, or mixes with, methyl chloride in all proportions, the freezing point of the resulting solution in methyl chloride varying somewhat according to the amount of complex therein. A mixture of 90 parts of methyl chloride and 10 parts of the complex as above prepared shows a freezing point approximately equal to that of pure methyl chloride itself.

Example I (a)

Five g. of the $AlCl_3$—$CH_3NO_2$ complex were diluted to 500 cc. with methyl chloride. 200 cc. of the resulting catalyst solution were added to 80 cc. of isobutylene and 20 cc. of butadiene, the latter two having been internally cooled with dry ice before the catalyst was added. Polymer formed slowly during the addition of the catalyst and for a short time thereafter. The yield was 24 grams. The polymer unsaturation was 0.51% based on the number of isobutylene and butadiene molecules entering into the polymerization. The molecular weight of the product was 11,000.

Example I (b)

150 cc. of catalyst prepared as in Example I (a) were slowly added to 100 cc. of isobutylene internally cooled with finely crushed dry ice. Polymer formed slowly and without violent reaction. The product was worked up by adding isopropyl alcohol and water in turn to the reaction products. A 35 gram yield of solid polymer was obtained. The molecular weight of the polymer was 34,000.

Example I (c)

243 g. of $AlCl_3$—$CH_3NO_2$ complex, prepared as described above were diluted to 2500 cc. with methyl chloride. The resulting solution was added to solution of 200 cc. of butadiene and 800 cc. of isobutylene in 2000 cc. of ethylene. Solid polymer separated. Analysis of the product after isolation showed the presence of 1.28 mole per cent of unsaturation based on the moles of polymerized isobutylene and butadiene. The polymer had a molecular weight of 9,000.

Example I (d)

60 g. of an $AlCl_3$—$CH_3NO_2$ complex, prepared as described above, were dissolved in 160 g. of methyl chloride. 90 g. of this catalyst solution were added over a period of five minutes to 50 g. of butadiene dissolved in 200 g. of methyl chloride. Solid polymer separated as the catalyst was added. The reaction progressed very smoothly. A yield of 30 g. was obtained.

Example I (e)

70 g. of the catalyst solution prepared as in Example I (d) were added to 50 g. of a commercial grade of piperylene diluted with 200 g. of methyl chloride. The polymer that former remained in solution. It was precipitated by the addition in turn of isopropyl alcohol and water. A 46 g. yield of a solid thermoplastic polymer was obtained.

Example I (f)

150 g. of $AlCl_3$ were dissolved in 150 g. of nitromethane. 100 g. of the complex were dissolved in 100 g. of methyl chloride, 70 g. of the resulting catalyst solution were added to 50 g. of isobutylene diluted with 150 g. of ethylene. Eight grams of a rubbery product were obtained. The molecular weight of the product was 17,000.

Example II 150 g. of $AlCl_3$ were added in small portions to 100 g. of diisobutylene. In order to complete the reaction, heat was applied until essentially all the dimer had reacted. After standing at Dry Ice temperature for several days, a small amount of unreacted dimer was rejected.

Seventy grams of the resulting complex were dissolved in 210 grams of methyl chloride. The resulting solution was used as the catalyst in the following work.

Example II (a)

40 g. of the above catalyst solution were further diluted with 40 g. of methyl chloride. The resulting solution was added dropwise to 50 g. of isobutylene diluted with 100 g. of methyl chloride. The reactants were internally cooled with crushed Dry Ice while the catalyst was being added. When sufficient product had formed, the addition of the catalyst was discontinued. A 30 g. yield of a solid product was obtained. The molecular weight of the product was 22,000.

Example II (b)

50 g. of butadiene and 100 g. of methyl chloride were cooled internally with Dry Ice while the above catalyst solution was added dropwise. Solid polymer formed and slowly separated. Catalyst addition was discontinued when considerable polymer had been formed. The yield was 11 grams.

Example II (c)

50 g. of propylene and 150 g. of MeCl were cooled internally with Dry Ice. 135 g. of the $AlCl_3$—diisobutylene catalyst solution described above were added. After two hours isopropyl alcohol and water were added in turn. 43 grams of a yellow oily polymer were obtained.

Example III

A concentrated solution of anhydrous aluminum chloride in nitromethane was prepared as in Example I (a). Simultaneously 10 volumes of isobutylene were cooled to −78° C. by the application of solid carbon dioxide. One volume of the solution of aluminum chloride in nitromethane was then added to the cooled isobutylene. No polymerization reaction occurred, but the aluminum chloride-nitromethane solution merely froze into a solid glassy lump. Upon warming, the isobutylene volatilized leaving the solution of aluminum chloride in nitromethane in its original form when room temperature was reached.

Thus, the invention consists of a catalyst made up from active halides analogous to the Friedel-Crafts type catalyst in combination with an organic solvent to form a complex, the complex being dissolved in a low freezing solvent; and the polymerization process consisting of the steps of preparing olefinic reactants at temperatures below 0° C. down to −100° C. or below and polymerizing the olefinic reactant by the application thereto of the catalyst of the invention at temperatures above that at which the second solvent freezes.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

The invention claimed is:

1. The process for the polymerization of olefinic materials at temperatures ranging between about −10° and about −150° C. in the presence of a catalyst comprising the complex formed by reacting aluminum chloride with nitromethane, the step which comprises carrying out the reaction in the presence of methyl chloride as a solvent for the complex catalyst.

2. The process for the polymerization of olefinic materials at temperatures ranging between about −10° and about −150° C. in the presence of a catalyst comprising the complex formed by reacting aluminum chloride with nitromethane, the step which comprises carrying out the reaction in the presence of ethyl chloride as a solvent for the complex catalyst.

3. In a process for the polymerization of olefinic materials at temperatures ranging between about −10° and −150° C. in the presence of a catalyst comprising a complex formed by reacting aluminum chloride with di-isobutylene, the step which comprises carrying out the reaction in the presence of an alkyl chloride having less than 3 carbon atoms as a solvent for the complex catalyst.

4. In a process for the polymerization of olefinic materials at temperatures ranging between about −10° and −150° C. in the presence of a catalyst comprising a complex formed by reacting aluminum chloride with di-isobutylene, the step which comprises carrying out the reaction in the presence of methyl chloride as a solvent for the complex catalyst.

5. In a process for the polymerization of isobutylene at a temperature of about −78° C. in the presence of a catalyst comprising the complex formed by reacting aluminum chloride with nitro-methane, the step which comprises carrying out the reaction in the presence of methyl chloride as a solvent for the complex catalyst.

6. The process for the polymerization of olefinic materials at temperatures ranging between about −10° C. and about −150° C. in the presence of a catalyst comprising the complex formed by reacting aluminum chloride with nitromethane, the step which comprises carrying out the reaction in the presence of an alkyl chloride having less than 3 carbon atoms as a solvent for the catalyst complex.

7. The process for the polymerization of olefinic materials at temperatures ranging between about −10° C. and about −150° C. in the presence of a catalyst comprising the complex formed by reacting aluminum chloride with a complex-forming organic solvent, the step which comprises carrying out the reaction in the presence of an alkyl chloride having less than 3 carbon atoms as a solvent for the catalyst complex.

8. The process for the polymerization of olefinic materials at temperatures ranging between about −10° C. and about −150° C. in the presence of a catalyst comprising the complex formed by reacting a Friedel-Crafts metal halide with a complex-forming organic solvent, the step which comprises carrying out the reaction in the presence of an alkyl chloride having less than 3 carbon atoms as a solvent for the catalyst complex.

ROBERT M. THOMAS.
JOSEPH F. NELSON.